July 15, 1924.  
H. A. S. HOWARTH  
BEARING  
Filed Nov. 5, 1920  
1,501,401  
3 Sheets-Sheet 1
Fig.1.
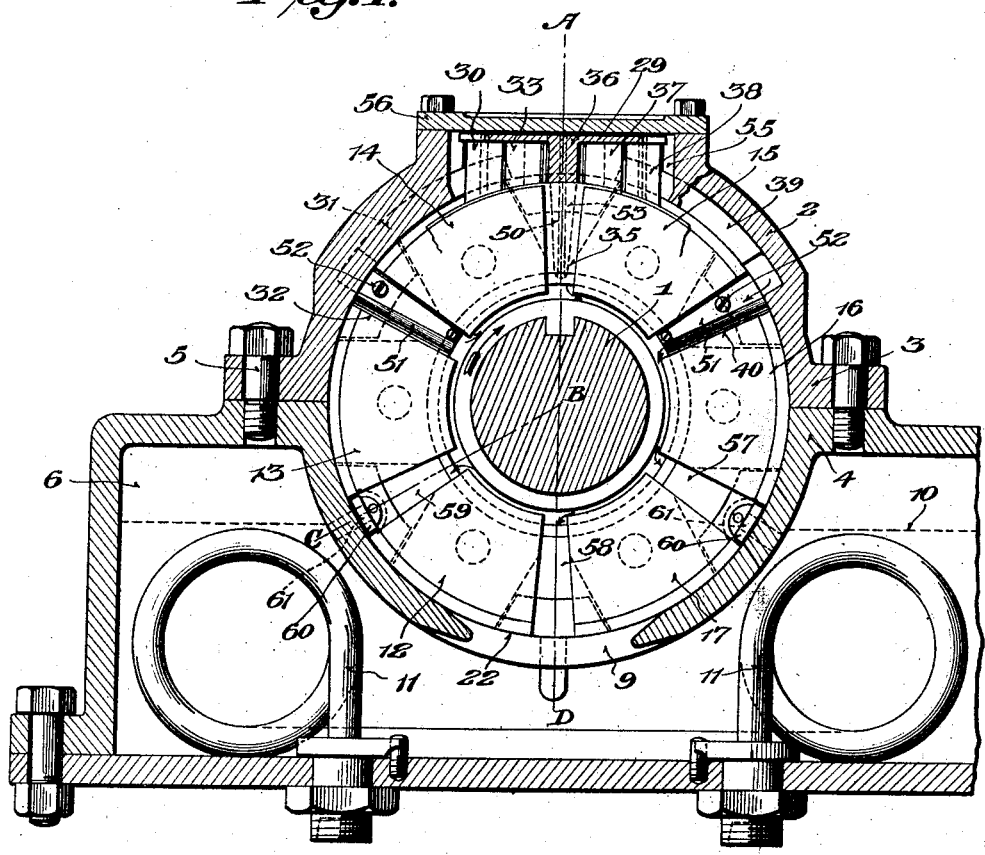
Fig.2ª
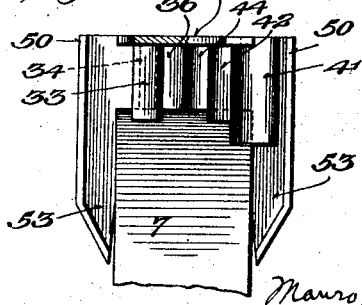

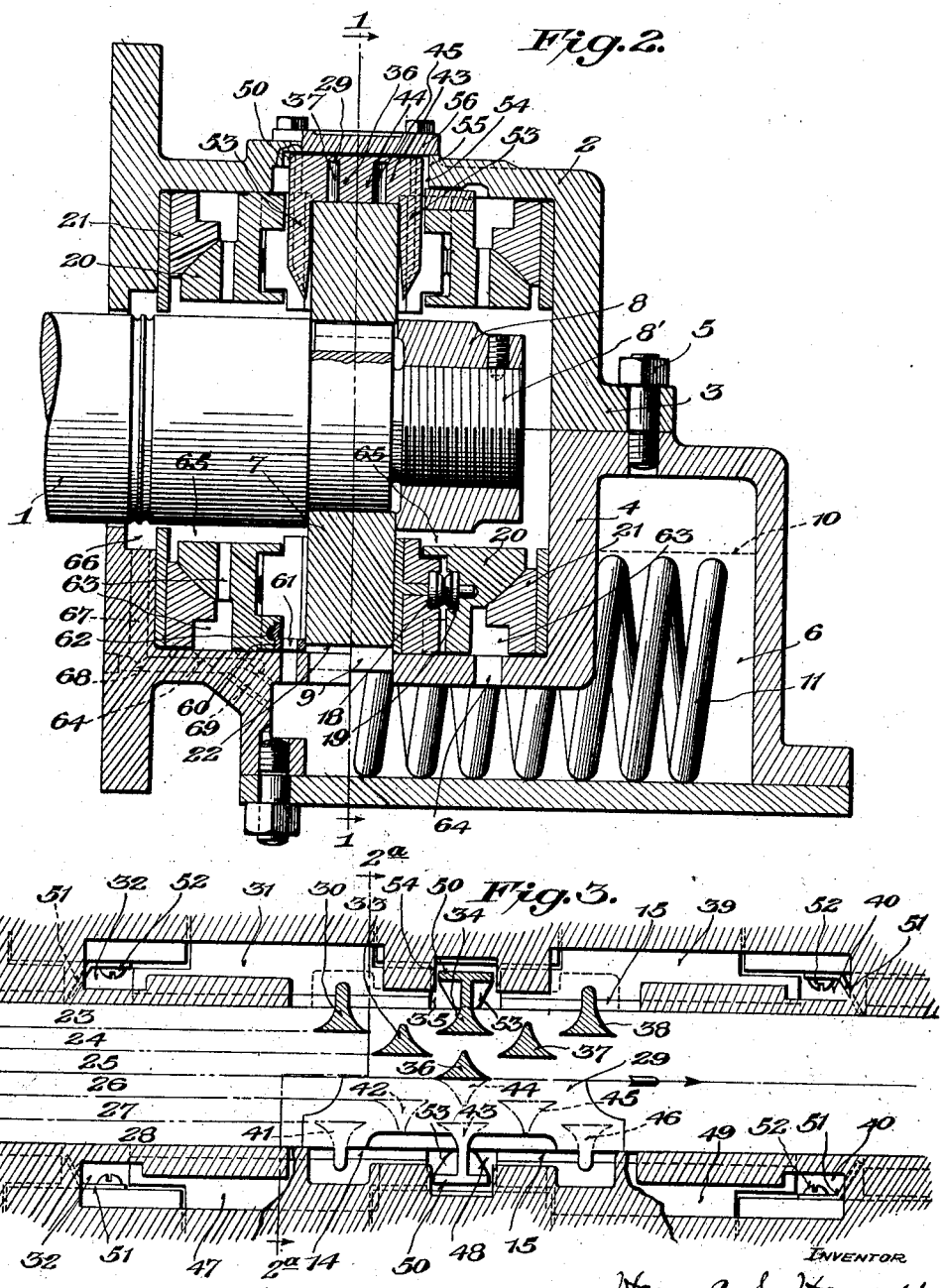

July 15, 1924.

H. A. S. HOWARTH

BEARING

Filed Nov. 5, 1920

Inventor
Harry A. S. Howarth,

WITNESS:—
Chas. L. Griesbauer

By Mauro, Cameron, Lewis & Kerkam,
Attorneys

Patented July 15, 1924.

1,501,401

UNITED STATES PATENT OFFICE.

HARRY A. S. HOWARTH, OF PITTSBURGH, PENNSYLVANIA, ASSIGNOR TO ALBERT KINGSBURY, OF PHILADELPHIA, PENNSYLVANIA.

BEARING.

Application filed November 5, 1920. Serial No. 421,967.

*To all whom it may concern:*

Be it known that I, HARRY A. S. HOWARTH, a citizen of the United States, and a resident of Pittsburgh, Pennsylvania, have invented new and useful Improvements in Bearings, which invention is fully set forth in the following specification.

This invention relates to bearings, and, more particularly, to bearings for horizontal or inclined shafts. While useful with a wide variety of bearings of this type, the present invention has special utility when embodied in a thrust bearing wherein one of the relatively rotatable bearing members is composed of a plurality of bearing segments or shoes.

Bearings for horizontal or inclined shafts which comprise a series of bearing members that extend above the level of the bottom of the shaft and are maintained immersed in a bath of lubricant possess the disadvantage that special provision must be made to prevent escape of the lubricant along the shaft. To avoid this difficulty it has been proposed to maintain the level of the oil below the shaft and to deflect oil onto the bearing members by the action of an oil-scraper cooperating with an oil-carrying surface rotatable with the shaft. The proper lubrication of the bearing surfaces in a bearing employing a plurality of bearing segments above the level of the oil in the well, however, requires that lubricant be supplied copiously to all of the bearing segments which are arranged above the level of the oil. It is an object of this invention to provide a bearing, comprising a rotatable oil-carrying surface, with oil-collecting and deflecting means whereby all of the segments positioned above the level of the oil in the well may be efficiently and sufficiently supplied with lubricant by oil collected from the oil-carrying surface.

It has also been proposed to mount an annular series of bearing segments in an oil-collecting chamber and maintain said chamber full of oil by the cooperation of oil-collecting and deflecting means with an oil-carrying surface rotatable with the shaft. The speed of rotation of some shafts, however, is insufficient for the oil-carrying surface to supply oil to said oil-collecting and deflecting means at a sufficient rate to maintain the chamber, in which the bearing members are positioned, full of oil. It is an object of this invention to provide a bearing, comprising a rotatable oil-carrying surface, with oil-collecting and deflecting means whereby an annular series of bearing segments may be efficiently and sufficiently lubricated even though the shaft rotates at a relatively low speed.

It has also been proposed to provide a thrust bearing for horizontal or inclined shafts with bearing segments mounted in cooperative relation with the upper portion of the thrust collar where said segments are readily accessible for inspection and repair, and to lubricate such segments by oil carried upwardly by said collar from an oil-well into which said collar dips. The proper lubrication of the bearing surfaces of a bearing of this construction, however, requires that oil be supplied copiously to all of the bearing segments by oil collected from the oil-carrying surface of said collar. It is an object of this invention to provide a thrust bearing for horizontal or inclined shafts wherein a plurality of bearing segments may be positioned in cooperative relation with a face of the thrust collar above the level of the oil in the well and all of said segments efficiently and sufficiently lubricated by oil carried upwardly on the oil-carrying surface of said collar.

Another object of this invention is to provide oil-collecting and deflecting means of improved construction whereby a plurality of streams of oil may be deflected to one or to each side thereof into operative relation with a plurality of bearing segments.

A further object of this invention is to provide oil-collecting and deflecting means of improved construction whereby oil may be collected from a plurality of zones of an oil-carrying surface and deflected in a plurality of streams into operative relation with a plurality of bearing segments.

Another object of this invention is to provide improved oil-collecting and deflecting means as heretofore characterized which is equally applicable to either direction of shaft rotation and which may be used with equal facility whether the bearing is designed to take thrust in one or both directions.

Other objects relate to the provision of a lubricating system for bearings which is simple in construction and efficient in operation.

Stated broadly, the invention comprises a bearing which includes a rotatable oil-carrying surface, a plurality of bearing segments, and means cooperating with said oil-carrying surface for deflecting a plurality of streams of oil to one or to each side thereof into operative relation with a plurality of said segments, said oil-deflecting means preferably comprising a plurality of oil-removing elements which cooperate with different zones of the oil-carrying surface.

The invention also comprises a bearing, including a plurality of bearing segments or shoes, with means for restricting the flow of oil from the passages between consecutive segments whereby said passages may be maintained full of oil whether the oil-collecting means deflects one or a plurality of streams into operative relation to said segments.

The invention is capable of receiving a variety of mechanical expressions, three of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same reference characters designate corresponding parts in the several figures, Figure 1 is a transverse section, on the line 1—1 of Fig. 2, of a thrust bearing for a horizontal shaft embodying the present invention, the thrust collar being omitted to more clearly illustrate the arrangement of bearing segments and oil passages.

Figure 2 is an axial section of the bearing shown in Figure 1, the portion of the bearing at the left of the thrust collar being a section on the line A—B—C of Figure 1 and the portion of the bearing at the right of the thrust collar being a section on the line A—B—D of Figure 1.

Figure 2ª is an elevation, partly broken away on the line 2ª—2ª of Fig. 3, of the oil-collecting means shown in the embodiment of Figs. 1 and 2.

Figure 3 is a developed plan view diagrammatically illustrating the arrangement of the oil-deflecting elements of the oil-collecting means shown in the embodiment of Figures 1 and 2.

Figure 4:
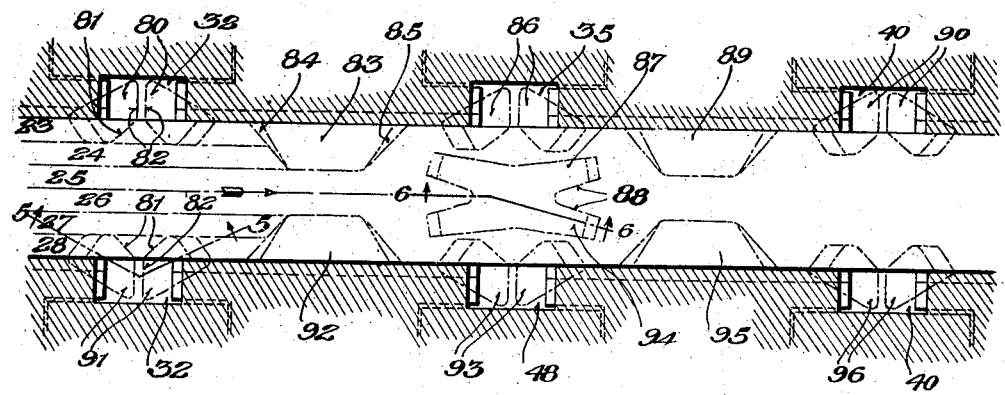
Figure 4 is a developed plan view illustrating schematically another embodiment of the present invention.

In the form shown in Figs. 1, 2 and 3, a horizontal shaft 1 extends within a bearing housing 2, the bearing housing proper being preferably of generally cylindrical formation and desirably composed of two parts 3 and 4 which are separable along a horizontal or inclined plane, but normally held in unitary relationship by a plurality of bolts 5 or other suitable means. Communicating with said housing is an oil well 6, which may be formed integrally with the lower part 4 of said housing, if desired. It is to be understood, moreover, that said bearing housing may also be so constructed as to provide guide bearings at one or both sides of the same, or guide bearings may be otherwise suitably provided for the shaft at one or both sides of the thrust bearing to be described.

Mounted on said shaft 1 is a thrust collar 7, suitably keyed thereto, and retained thereon in any suitable way, as by a ring nut 8 cooperating with the threaded end 8' of the shaft. Said thrust collar rotates over an opening 9 in the cylindrical wall which separates the chamber within the bearing housing proper from the oil well, the oil within the latter being preferably maintained at a level below that of the shaft, at substantially the level indicated by the dotted line 10, for example, but sufficiently high to flow into and fill the spaces in the lower portion of the bearing housing proper. The peripheral surface of the thrust collar therefore dips into the oil and thereby constitutes an oil-carrying surface whereby oil may be carried upwardly thereon to the upper portion of the bearing for collection and deflection by means to be described. One or more cooling coils 11 may be positioned within the oil well and, as the rotation of the collar maintains the oil in motion, said coils may maintain the oil sufficiently cool. If desired, however, the oil may be circulated through exterior cooling means and thereafter returned to said well.

Cooperating with each face of the thrust collar 7, in the form shown, are a plurality of bearing segments of any suitable construction and mounted in any suitable way. The bearing illustrated is therefore adapted to take thrust in either direction, but it is to be understood that, if the bearing is designed to take thrust in one direction only, bearing segments need be supplied for cooperation with only one face of the thrust collar. Any suitable number of bearing segments may be employed, the structure illustrated comprising six segments, respectively designated 12, 13, 14, 15, 16, and 17, arranged in a complete annular series on each side of the collar. Said segments are shown as mounted to tilt both radially and circumferentially of the bearing, as by the provision of spherically-faced projections 18 in the back of each segment cooperating with insets 19 in an equalizing ring 20 having a spherical face cooperating with a spherical recess in a base ring 21, but it is to be understood that said segments may be mounted in any other suitable way if desired; and while said segments have been shown as in the form of separate shoes, it is also to be understood that any other suitable construction of bearing members may be employed.

Cooperating with the oil-carrying surface 22 afforded by the periphery of the thrust collar 7 is oil-collecting and deflecting means for directing oil into operative relation with said bearing segments. Referring to the developed plan of Fig. 3, wherein the oil-collecting and deflecting means is shown as adapted for either direction of shaft rotation and for supplying oil to both faces of a thrust collar the oil-carrying surface is indicated as rotating in the direction of the arrow. To clearly understand the constuction and operation of the oil-collecting and deflecting means it may be assumed that the oil-carrying surface 22 is divided into a plurality of circumferential zones respectively designated 23, 24, 25, 26, 27, and 28. In conformity with the present invention, a plurality of oil-removing elements are mounted in cooperative relation with said oil-carrying surface so that each will deflect the oil carried by one of the aforesaid zones, either with or without the assistance of other elements, into operative relation with one of the bearing segments, preferably into one of the oil passages between successive bearing segments.

In the form shown in Figs. 1 to 3, the oil-collecting means floats on the peripheral surface of the thrust collar and the oil-deflecting elements are provided as projections from a plate-like member 29, the bottom faces of said projections being so shaped as to conform with the peripheral surface of the thrust collar so that they may rest on the oil-carrying surface 22. One element 30 is so positioned and constructed as to remove oil from the zone 23 and deflect it into an oil passage 31 suitably formed in the stationary bearing parts, said passage 31 leading to the passage 32 between the segments 13 and 14. Another element 33 is so positioned and constructed as to remove oil from the zone 24 and deflect it onto the zone 23 at the rear of element 30, whence it is deflected by an element 34 into the passage 35 between the segments 14 and 15. Another element 36 is so positioned and constructed as to remove oil from zone 25 and deflect it onto the zone 24 at the rear of element 33, whence it is deflected by an element 37 onto the zone 23 at the rear of element 34, whence it is deflected by an element 38 into an oil passage 39, also suitably provided in the stationary parts of the bearing, leading to the oil passage 40 between the bearing segments 15 and 16.

Each of said elements 30, 33, 34, 36, 37, and 38 are symmetrically shaped with respect to a transverse or axial line so as to provide oil-removing and deflecting surfaces at both sides thereof. It will therefore be apparent that if the thrust collar 7 is rotated in the opposite direction from that indicated by the arrow, element 38 will deflect oil from the zone 23 into the passages 39 and 40; element 37 will deflect oil from the zone 24 onto the zone 23 from which it will be deflected by element 34 into the oil passage 35; and element 36 will deflect the oil in zone 25 onto the zone 24 from which it will be deflected by the element 33 onto the zone 23 and by the element 30 into the oil passages 31 and 32. It is to be understood, however, that the projections need not be made double-faced if the shaft is to rotate in one direction only.

Where the bearing is also to take thrust in both directions, so that segments cooperating with both faces of the thrust collar must be supplied with lubricant, the oil-removing elements are also arranged symmetrically with respect to a circumferential medial line, the elements 41, 42, 43, 44 (which may be made integral with element 36), 45, and 46 conforming in arrangement and construction to the elements 30, 33, 34, 36, 37, and 38 respectively, so as to deflect oil from the zones 26, 27, and 28 to the oil passages 47, 48, and 49 respectively. It is to be expressly understood, however, that if the bearing is designed to take thrust in one direction only the oil-carrying surface need be divided into only three zones and the elements designated 41 to 46 may be omitted.

If the streams of oil respectively directed into the aforesaid oil passages do not properly wet the bearing surface or surfaces of the thrust collar, any suitable means may be provided for deflecting the oil flowing into and through said passages into contact with the bearing face or faces of the collar. In the form shown, the element 34, and its opposed corresponding element 43 when used, is provided with a transverse oil-deflecting wall 50, which may project to either side as shown when the bearing is arranged for either direction of shaft rotation. Said transverse deflecting wall 50 operates to deflect the oil flowing into the passage 35 into contact with the face of the thrust collar. Also, in each of the passages 32 and 40, and in the corresponding passages at the opposite face of the thrust collar when the bearing is double acting, oil-deflecting members, shown as suitably bent plates 51, may be fastened, as by screws 52, to the ring 20, said plates 51 similarly operating to deflect the oil flowing into the corresponding passages into contact with the face or faces of the thrust collar. In place of oil-deflecting plates, however, the edges of the bearing segments may be beveled, or any other suitable means employed, to direct the oil into contact with the face or faces of the collar.

The oil scraper constituted by said plate 29 and its plurality of projections may be retained on the periphery of the thrust collar in any suitable way. In the form shown, the elements 34 and 43 extend downwardly on either side of the collar, as shown at 53 in Figs. 2 and 2ª, whereby said oil scraper is centered on said collar. Said scraper is also prevented from rotating with the thrust collar in any suitable way, as by the provision of slots 54 in the housing part 3 to engage the projections 34 and 43 respectively. The housing is also shown as provided with an opening 55 above the oil scraper so as to permit ready insertion and withdrawal thereof, said opening 55 being closed by a cover 56 of any suitable construction.

Some of the oil directed into the passages 32, 35 and 40 flows therethrough to the inner periphery of the thrust collar whence, following the rotation of the shaft, it flows into the passages 57, 58 and 59 between the segments 16, 17, and 17, 12, and 12, 13, respectively. This oil so delivered to the passages between the segments in the lower part of the bearing insures that the inner portions of the last-named bearing segments will be suitably lubricated notwithstanding the level of the oil maintained in the well or existing by reason of the withdrawal of oil therefrom and its delivery to the bearing surfaces, and notwithstanding the depression of the oil level by the action of centrifugal force. To retard the flow of oil through these passages 57, 58, and 59, said passages may be constricted in any suitable way. In the form shown, closure members 60, which may be made conveniently of Babbitt metal, are mounted in the outlet of each of the passages 57 and 59 and provided with an aperture 61 extending therethrough, which aperture is selected of such a size as to properly restrict the flow of oil through the corresponding passage so as to maintain said passage filled with oil. Said closure members 60 may be retained in position in any suitable way, being shown as each provided with a flange 62 dovetailed into a recess in the ring 20 and suitably retained therein, as by a screw. A similar closure member may be positioned in the outlet of passage 58, if desired, but as said passage is normally filled with oil owing to the level of oil maintained in the well, such a member is generally unnecessary at this place.

To provide for the return to the well of any oil that flows longitudinally of the shaft, as when the rate of supply to the passages 57, 58, and 59 is in excess of that required to maintain them full, or for any other reason, oil passages 63 may be formed in the stationary parts of the bearing and communicate with the oil well through passages 64. Therefore, any oil flowing axially outward along the passages 65 is returned to the oil well by said passages 63 and 64. An oil-collecting recess 66 is also shown adjacent the opening where the shaft enters the bearing housing and said recess also communicates with the oil well through bored passages 67, 68, and 69.

Figure 7:
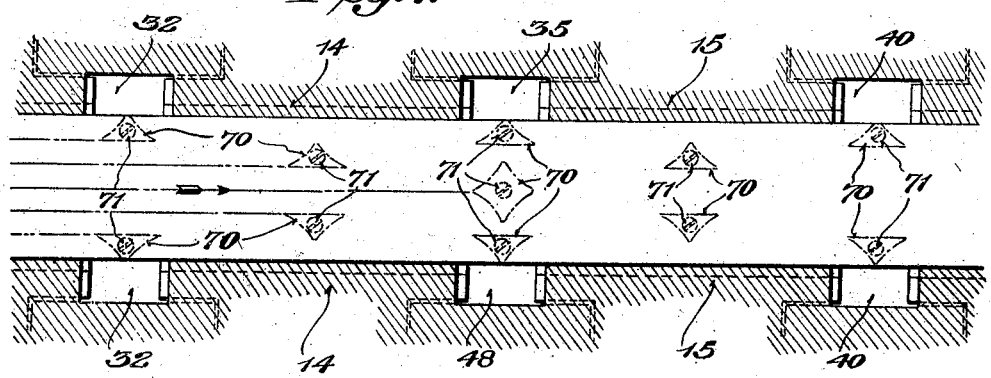
Figure 7 is a developed plan view schematically illustrating another embodiment of the present invention.

In the construction so far described, the oil-removing and deflecting elements are united to form a one-piece oil scraper that may be readily inserted into and removed from the bearing housing through the opening 55. It is not necessary, however, that said elements be connected into a unit. In the form shown in Fig. 7, a plurality of oil-removing elements in the form of projections 70 are mounted in any suitable way, as by screws 71, on the cylindrical wall of the housing in position to cooperate with the oil-carrying surface 22 of the thrust collar 7. These oil-removing elements conform in number, relative location, and function to the several oil-removing elements shown in Fig. 3, being shown as double-faced to remove oil for either direction of shaft rotation and symmetrically spaced with respect to a circumferential medial line so as to deflect oil to both sides of the thrust collar. As these oil-removing elements can be separately mounted in any desired location, they possess the advantage that the end elements can be positioned directly opposite the oil passages 32 and 40, thereby eliminating the necessity for the passages 31 and 39, and 47 and 49, in the stationary parts of the bearing.

Figure 5:
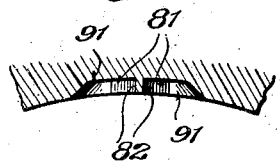
Figure 5 is a section on the line 5—5 of Fig. 4.
Figure 6:
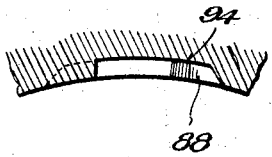
Figure 6 is a section on the line 6—6 of Fig. 4.

In place of the oil-removing elements heretofore described said elements may be formed by the walls of recesses in the cylindrical wall of the housing, if said wall closely embraces the oil-carrying surface 22 and the shaft rotates with sufficient speed. In the form shown in Figs. 4 to 6, the oil-removing elements are formed by recesses which are illustrated in dot and dash line in Fig. 4 as superimposed upon the peripheral surface of the thrust collar. Again assuming that the oil-carrying surface 22 is divided into zones 23, 24, 25, 26, 27, and 28, a recess 80 is positioned in the cylindrical wall of the housing in the path of the oil in zone 23. This recess has a generally helical surface 81 and an axial surface 82. Consequently, the oil in zone 23, upon reaching said recess 80, will be deflected axially by the helical surface 81 into engagement with the surface 82, by which it will be deflected downwardly into the oil passage 32. A recess 83 is positioned at the rear of the recess 80 and extends inwardly across the zone 24. This recess has oppositely-inclined generally-helical surfaces 84, 85. Therefore, oil in the zone 24 will be deflected axially by the surface 85 onto the zone 23 of the oil-carrying surface, and from the latter zone the oil is deflected axially into the oil passage 35 by the generally-helical wall of a recess 86 conforming in construction and function to the recess 80. Oil in the zone 25 is deflected axially by the generally-helical wall 88 of a recess 87 onto the zone 24 of the oil-carrying surface; from the latter zone the oil is deflected axially onto the zone 23 of the oil-carrying surface by the generally-helical wall of a recess 89 conforming in construction and function to recess 83; and from the latter zone the oil is deflected into the oil passage 40 by the generally-helical wall of a recess 90 conforming in construction and function to the recesses 80 and 86.

If the shaft is to receive thrust in one direction only, the oil-carrying surface 22 need be composed of only the three zones heretofore referred to. If the shaft is to receive thrust in both directions, however, the oil-carrying surface is divided into six zones, as heretofore referred to, and recesses 91, 92, 93, 94, 95, and 96, conforming in construction and function to the recesses 80, 83, 86, 87, 89, and 90, respectively, are symmetrically arranged, with respect to said last-named recesses, on the opposite side of the medial circumferential line of the oil-carrying surface, said recesses 91 to 96 operating to deflect oil into the oil passages 32, 48, and 40 between the bearing segments cooperating with the opposed face of the thrust collar. In the latter event, the recesses 87 and 94 may be made conveniently as one bifurcated recess as shown. All of the aforementioned recesses may also be made symmetrical with respect to transverse or axial lines as shown if the shaft may be rotated in either direction, so that the oil may be deflected into the respective oil passages in the manner heretofore described when the oil-carrying surface is rotated in a direction opposite to that indicated by the arrow in Fig. 4.

When the thrust bearing as heretofore described is to be used in conjunction with one or more guide bearings, the latter may be lubricated by oil supplied thereto by oil-collecting and deflecting means in accordance with the present invention, if desired, by providing passages to the guide bearing or bearings from the chambers in which the thrust bearing members operate or by providing one or more of the oil-removing elements with oil-admitting passages communicating in any suitable way with passages leading to the guide bearing or bearings.

It will therefore be perceived that oil-collecting and deflecting means have been provided whereby a plurality of consecutive bearing segments positioned above the level of the oil in the well may each be copiously supplied with lubricant. While the illustrated embodiments of the invention comprise only three bearing segments cooperating with each face of the thrust collar above the level of the oil in the well, it is apparent that, in accordance with the present invention, the oil-collecting and deflecting means may be so constructed as to supply individual oil streams to a smaller or a larger number of segments. Therefore, the present invention enables the use of a series of any suitable number of bearing segments, with a copious supply of oil to each of them, without the necessity of all of the segments being maintained immersed in a bath of oil. The present invention also enables an adequate lubrication of an annular series of bearing segments even though the shaft does not rotate at a speed sufficient to maintain a bath of oil in which the bearing segments can be immersed. Furthermore, the present invention enables the use of a plurality of bearing segments in the upper portion only of the bearing, where they are readily accessible for inspection and repair, in conjunction with an oil-well wherein the oil level is maintained below the shaft, by insuring that each of said bearing segments shall be supplied with a sufficient quantity of oil to effect a copious lubrication. It will also be perceived that improved oil-collecting and deflecting means have been provided to deflect a plurality of streams of oil into operative relation with a plurality of bearing segments by collecting oil from a plurality of zones of an oil-carrying surface, which means is equally available for shafts which may be rotated in either one or both directions and for bearings designed to take the thrust in either one or both directions.

While the embodiments of the invention shown on the drawings have been described with considerable particularity it is to be expressly understood that the invention is not to be restricted thereto, as the same is capable of receiving a variety of mechanical expressions, some of which will readily suggest themselves to those skilled in the art, while certain features thereof are capable of use without other features thereof. Changes may also be made in the details of construction, arrangement, and location of parts without departing from the spirit of the present invention. Reference is therefore to be had to the claims hereto appended for a definition of said invention.

What is claimed is:

1. In a bearing, a rotatable thrust collar having an oil-carrying surface, a plurality of bearing segments co-operating with a face of said collar, and relatively stationary means for collecting oil from said oil-carrying surface and directing it simultaneously into operative relation with a plurality of segments cooperating with the same face of the thrust collar.

2. In a bearing, a rotatable thrust collar having an oil-carrying surface, a plurality of bearing segments cooperating with the upper portion of a face of said collar, and relatively stationary means for collecting oil from said oil-carrying surface and directing it simultaneously into operative relation with each of a plurality of said segments.

3. In a bearing, a rotatable thrust collar having an oil-carrying surface, a plurality of bearing segments cooperating with a face of said collar, and relatively stationary means for collecting oil from said oil-carrying surface and directing it in a plurality of streams into operative relation with a plurality of segments cooperating with the same face of the thrust collar.

4. In a bearing, a rotatable thrust collar having an oil-carrying surface, a plurality of bearing segments cooperating with the upper portion of a face of said collar, and relatively stationary means for collecting oil from said oil-carrying surface and directing it in a plurality of streams into operative relation with each of a plurality of said segments.

5. In a bearing, a rotatable thrust collar, an oil-well into which said collar extends, a plurality of bearing segments cooperating with a face of said collar above the level of the oil in said well, and relatively stationary means for collecting oil from said collar and directing it into separate and simultaneous operative relation with a plurality of said segments cooperating with the same face of the thrust collar.

6. In a bearing, a rotatable thrust collar, an oil-well into which said collar extends, a plurality of bearing segments cooperating with a face of said collar and providing a plurality of oil passages therebetween, and relatively stationary means for collecting oil from said collar and directing it in a plurality of streams into a plurality of oil passages on the same side of the thrust collar.

7. In a bearing, a rotatable thrust collar, an oil well into which said collar extends, a plurality of bearing segments cooperating with a face of said collar, and relatively stationary means for collecting oil from said collar and directing it simultaneously between a plurality of segments cooperating with the same face of the thrust collar.

8. In a bearing, a rotatable thrust collar, an oil-well into which said collar extends, bearing means cooperating with a face of said collar and including a plurality of bearing segments above the level of the oil in said well, and relatively stationary means for collecting oil from said collar and directing it in a plurality of streams to each of a plurality of said segments.

9. In a bearing, a rotatable thrust collar having an oil-carrying surface, a plurality of segments cooperating with the opposed faces of said collar, and relatively stationary means for collecting oil from said oil-carrying surface and directing it in a plurality of streams to each side of said collar and into cooperative relation with said segments.

10. In a bearing, a rotatable thrust collar having an oil-carrying surface, bearing means cooperating with the opposed faces of said collar and comprising a plurality of bearing segments coacting with the upper portions of said faces, and relatively stationary means for collecting oil from said oil-carrying surface and directing it in a plurality of streams to each side of the collar.

11. In a bearing, a rotatable thrust collar having an oil-carrying surface, a plurality of bearing segments co-acting with each of the opposed faces of said collar, and relatively stationary means for collecting oil from said oil-carrying surface and directing it simultaneously into operative relation with a plurality of segments on each side of said collar.

12. In a bearing for a horizontal or inclined shaft, a rotatable thrust collar, an oil-well into which said collar dips, a plurality of bearing segments cooperating with a face of said collar above the level of the oil in said well, and means for supplying said segments with lubricant comprising a plurality of relatively stationary members for removing oil from the peripheral surface of said collar and directing it in a plurality of streams to said segments.

13. In a bearing for a horizontal or inclined shaft, a rotatable thrust collar, an oil-well into which said collar dips, a plurality of bearing segments cooperating with a face of said collar above the level of the oil in said well, and means for supplying said segments with lubricant comprising separate members for directing a stream of oil to each of a plurality of said segments.

14. In a bearing for a horizontal or inclined shaft, a rotatable thrust collar, an oil-well into which said collar dips, a plurality of bearing segments cooperating with a face of said collar above the level of the oil in said well, and means for supplying said segments with lubricant comprising members associated with each of a plurality of said segments for removing oil from different portions of said collar and directing it to said segments.

15. In a thrust bearing, a rotatable member having an oil-carrying surface and a thrust surface, and relatively stationary means for removing oil from said oil-carrying surface and directing it in a plurality of streams to one side thereof and into operative relation with said thrust surface.

16. In a bearing, a rotatable oil-carrying surface, and means for removing oil from said surface comprising a plurality of coacting parts for removing oil from different portions of said surface and directing it in a plurality of streams to one side of said surface.

17. In a bearing, a rotatable oil-carrying surface, and a plurality of relatively stationary oil-removing elements cooperating with said surface to remove oil therefrom in a plurality of streams directed to one side of said surface.

18. In a bearing, a rotatable oil-carrying surface and a plurality of oil-removing elements cooperating with different zones of said surface and directing the oil in a plurality of streams to one side of said surface.

19. In a bearing, a rotatable member having an oil-carrying surface and opposed thrust surfaces, and relatively stationary means for removing oil from said oil-carrying surface and directing it in a plurality of streams to each side into operative relation with each of said thrust surfaces.

20. In a bearing, a rotatable oil-carrying surface, and a plurality of relatively stationary oil-removing elements cooperating therewith and directing a plurality of streams of oil to each side of said surface.

21. In a bearing, a rotatable collar having an oil-carrying surface, a plurality of bearing segments cooperating with said collar, means cooperating with said oil-carrying surface for collecting oil therefrom and directing it in a plurality of streams to one side of said collar, and means for deflecting said streams against the bearing face of said collar.

22. In a bearing, a rotatable collar having an oil-carrying surface, a plurality of bearing segments cooperating with a face of said collar and providing oil passages between said segments, means cooperating with said oil-carrying surface for removing oil therefrom and directing it to said passages, and means in one or more of said passages for directing the oil against the bearing face of said collar.

23. In a bearing, a rotatable collar having an oil-carrying surface, a plurality of bearing segments cooperating with a face of said collar and providing oil passages between said segments, means cooperating with said oil-carrying surface for removing oil therefrom and directing it in a plurality of streams to said passages, some of said oil flowing therethrough to other of said passages, and means in one or more of said last-named passages for retarding the flow of oil therethrough.

24. In a bearing, a rotatable collar having an oil-carrying surface, a plurality of bearing segments cooperating with said collar and providing oil-passages between said segments, means cooperating with said oil-carrying surface for directing oil into one or more of said passages, some of said oil flowing therethrough into other of said passages, and means in one or more of said last-named passages for restricting the flow of oil therefrom.

25. In a bearing, a rotatable collar having an oil-carrying surface, a plurality of bearing segments cooperating with said collar and providing oil-passages between said segments, means cooperating with said oil-carrying surface for directing oil into a plurality of said passages, some of said oil flowing therethrough into other of said passages, and means for constricting the outlets of one or more of said oil passages.

26. Means for collecting oil from an oil-carrying surface comprising a plurality of relatively stationary elements adapted to remove oil therefrom and respectively deflect it in a plurality of streams to one side thereof.

27. Means for collecting oil from an oil-carrying surface comprising a plurality of elements adapted to cooperate with different zones of said surface and respectively deflect it in a plurality of streams to one side thereof.

28. Means for collecting oil from an oil-carrying surface comprising a plurality of relatively stationary elements respectively adapted to deflect oil to each side of said means in a plurality of streams on each side thereof.

29. Means for collecting oil from an oil-carrying surface comprising a plurality of relatively stationary elements adapted to cooperate with said surface and respectively adapted to deflect oil to the same side thereof in a plurality of streams for either direction of shaft rotation.

30. In a bearing, a rotatable member, an oil well into which said member dips, a plurality of bearing segments cooperating with a face of said member above the level of the oil in said well and providing a plurality of oil passages, and relatively stationary means cooperating with said member for deflecting oil into each of a plurality of said passages.

31. In a bearing, a rotatable member having an oil-carrying surface, a plurality of bearing segments cooperating with a face of said member and each provided with an oil passage, and relatively stationary means associated with each of a plurality of said passages for removing oil from said oil-carrying surface and deflecting it into said passages.

32. In a bearing, a rotatable member, an oil well into which said member extends, a plurality of bearing segments, and means cooperating with said member for supplying lubricant to a plurality of segments which are above the level of the oil in said well, comprising oil-removing means associated with each of said last-named segments and adapted to deflect a stream of oil into operative relation therewith.

33. In a bearing, a rotatable member provided with an oil-carrying surface, an oil well into which said member dips, a plurality of bearing segments cooperating with said member above the level of the oil in said well, and means cooperating with said member for supplying lubricant to said segments comprising a plurality of elements cooperating with different zones of said oil-carrying surface and each deflecting a stream of oil into operative relation with one of said segments.

34. In a bearing, a rotatable collar having an oil-carrying surface, an oil well into which said surface dips, a plurality of bearing segments cooperating with a face of said collar, and a scraper cooperating with said oil-carrying surface and comprising a plurality of oil-removing elements adapted to deflect oil from said surface to one side thereof in a plurality of streams.

35. In a bearing, a rotatable collar having an oil-carrying surface, an oil well into which said surface dips, a plurality of bearing segments cooperating with a face of said collar, and a scraper cooperating with said oil-carrying surface and comprising a plurality of oil-removing elements adapted to deflect oil from different zones of said oil-carrying surface to one side thereof in a plurality of streams.

36. In a bearing, a rotatable collar having an oil-carrying surface, an oil well into which said surface dips, a plurality of bearing segments cooperating with a face of said collar, and a scraper cooperating with said oil-carrying surface and comprising a member having a plurality of oil-removing elements projecting therefrom and shaped to cooperate with the surface of said collar, said projections being positioned to deflect oil to one side of said collar in a plurality of streams.

37. In a bearing, a rotatable collar having an oil-carrying surface, an oil well into which said surface dips, a plurality of bearing segments cooperating with each side of said collar, and a scraper cooperating with said oil-carrying surface and comprising a plurality of oil-removing elements adapted to deflect oil into operative relation with a plurality of segments on each side of said collar.

38. In a bearing, a rotatable collar having an oil-carrying surface, an oil well into which said surface dips, a housing surrounding said collar, a plurality of bearing segments cooperating with said collar, and a plurality of oil-removing elements on said housing adapted to deflect oil laterally from said oil-carrying surface in a plurality of streams.

39. In a bearing, a rotatable collar having an oil-carrying surface, an oil well into which said surface dips, a housing surrounding said collar, a plurality of bearing segments cooperating with said collar, and a plurality of oil-removing elements on said housing cooperating with different zones of said oil-carrying surface to deflect oil laterally in a plurality of streams.

40. In a bearing, a rotatable collar having an oil-carrying surface, an oil well into which said surface dips, a housing surrounding said collar, a plurality of bearing segments cooperating with said collar above the level of the oil in said well, and an oil-removing element associated with each of a plurality of said segments and mounted on said housing for deflecting oil from said oil-carrying surface into operative relation with said segments.

41. In a bearing, a rotatable collar having an oil-carrying surface, an oil well into which said surface dips, a housing surrounding said collar, a plurality of bearing segments cooperating with said collar and providing oil passages between said segments, and a plurality of oil-removing elements on said housing associated with said passages for deflecting oil from said oil-carrying surface into said passages.

42. In a bearing, a rotatable collar having an oil-carrying surface, an oil well into which said surface dips, a housing closely surrounding the upper portion of said collar, a plurality of bearing segments cooperating with said collar, and a plurality of recesses in said housing for deflecting oil from said oil-carrying surface into operative relation with said segments.

43. In a bearing, a rotatable collar having an oil-carrying surface, an oil well into which said surface dips, a housing closely surrounding the upper portion of said collar, a plurality of bearing segments cooperating with said collar, and a plurality of recesses in said housing cooperating with different zones of said oil-carrying surface for deflecting oil into operative relation with said segments.

44. In a bearing, a rotatable collar having an oil-carrying surface, an oil well into which said surface dips, a housing closely surrounding the upper portion of said collar, a plurality of bearing segments cooperating with said collar above the level of the oil in said well, and a plurality of recesses in said housing for deflecting oil from said oil-carrying surface into operative relation with each of a plurality of said segments.

45. In a bearing, a rotatable collar having an oil-carrying surface, an oil well into which said surface dips, a housing closely surrounding the upper portion of said collar, a plurality of bearing segments cooperating with said collar and providing oil passages between said segments, and a plurality of recesses in said housing for deflecting oil from said oil-carrying surface into said oil passages.

46. In a bearing, a rotatable collar having an oil-carrying surface, an oil well into which said surface dips, a plurality of bearing segments cooperating with a face of said collar, and relatively stationary means operative for either direction of shaft rotation for deflecting oil in a plurality of streams from said oil-carrying surface into operative relation with a plurality of said segments.

47. In a bearing, a rotatable collar having an oil-carrying surface, an oil well into which said surface dips, a plurality of bearing segments cooperating with a face of said collar, and a plurality of oil-removing elements cooperating with a plurality of zones of said oil-carrying surface and operative in either direction of shaft rotation to deflect oil to one side of said collar in a plurality of streams.

48. In a bearing, a rotatable collar having an oil-carrying surface, an oil well into which said surface dips, a plurality of bearing segments cooperating with a face of said collar above the level of the oil in said well, and relatively stationary means operative in either direction of shaft rotation for deflecting oil from said oil-carrying surface simultaneously into operative relation with each of a plurality of said segments.

49. In a bearing, a rotatable collar having an oil-carrying surface, an oil well into which said surface dips, a plurality of bearing segments cooperating with each face of said collar, and a plurality of oil-removing elements cooperating with said oil-carrying surface and respectively adapted to deflect oil in a plurality of streams to each side of said collar for either direction of shaft rotation.

50. In a bearing, a rotatable thrust collar having an oil-carrying surface, a plurality of bearing segments cooperating with a face of said collar, means for collecting oil from said oil-carrying surface and directing it into one or more of the passages between consecutive segments, and means at the outer ends of one or more of the passages between consecutive segments for restricting the flow of oil therefrom.

51. In a bearing, a rotatable thrust collar having an oil-carrying surface, a plurality of bearing segments cooperating with a face of said collar, a housing providing a chamber in which said segments are disposed, means for collecting oil from said oil-carrying surface and directing it into said chamber, and means for restricting the flow of oil through the inter-segment spaces to maintain said spaces full of oil.

52. In a bearing, a rotatable thrust collar having an oil-carrying surface, a plurality of bearing segments cooperating with a face of said collar, a housing providing a chamber in which said segments are disposed, means for collecting oil from said oil-carrying surface and directing it into said chamber, and members for constricting one or more of the passages between consecutive bearing segments.

53. In a bearing, a rotatable collar having an oil-carrying surface, an oil well into which said surface dips, a plurality of bearing segments cooperating with a face of said collar, and an oil-scraper cooperating with said oil-carrying surface and comprising a plurality of oil-removing elements adapted to deflect oil into operative relation with a plurality of said segments.

54. In a bearing, a rotatable collar having an oil-carrying surface, an oil well into which said surface dips, a plurality of bearing segments cooperating with a face of said collar and having oil passages therebetween, and means operative for either direction of shaft rotation for deflecting oil in a plurality of streams into a plurality of said passages.

55. In a bearing, relatively rotatable bearing members including a plurality of bearing segments and a rotatable oil-carrying surface, and means including a plurality of separate oil deflecting elements for deflecting a plurality of streams of oil one to each of a plurality of said segments.

56. In a bearing, relatively rotatable bearing members including a plurality of bearing segments and a rotatable oil-carrying surface, and means including a plurality of separate oil deflecting elements for deflecting a plurality of streams of oil from different zones of said oil-carrying surface to a plurality of passages between bearing segments.

In testimony whereof I have signed this specification.

HARRY A. S. HOWARTH.